United States Patent [19]

Tangorra et al.

[11] Patent Number: 4,595,167
[45] Date of Patent: Jun. 17, 1986

[54] ANTIVIBRATION DEVICE PARTICULARLY ADAPTED FOR AN AUTOMOTIVE ENGINE SUPPORT

[75] Inventors: Giorgio Tangorra, Monza; Edoardo Robecchi, Sesto S. Giovanni, both of Italy

[73] Assignee: Industrie Pirelli S.p.A., Milan, Italy

[21] Appl. No.: 597,022

[22] Filed: Apr. 5, 1984

[30] Foreign Application Priority Data

Apr. 8, 1983 [IT] Italy ............................ 20503 A/83

[51] Int. Cl.[4] ........................ F16M 7/00; F16F 3/08; F16F 1/36
[52] U.S. Cl. ................................ 248/638; 248/565; 248/636; 267/33; 267/153
[58] Field of Search ............... 248/638, 565, 562, 636, 248/659; 267/136, 33, 152, 153, 63 R

[56] References Cited

U.S. PATENT DOCUMENTS

| | | | |
|---|---|---|---|
| 3,323,764 | 6/1967 | Johnson | 267/152 X |
| 3,542,353 | 11/1970 | Hickman | 267/153 X |
| 3,696,891 | 10/1972 | Poe | 74/492 X |
| 3,820,634 | 6/1974 | Poe | 267/153 X |
| 4,236,606 | 12/1980 | Sunakoda et al. | 248/562 X |

*Primary Examiner*—Ramon S. Britts
*Assistant Examiner*—Karen J. Chotkowski
*Attorney, Agent, or Firm*—Stevens, Davis, Miller & Mosher

[57] ABSTRACT

The invention relates to an antivibration device particularly adapted for mounting motorcar engines, comprising a shaft (2) fixed to a base and supporting above it a metallic plate (3), fixing one extremity of a metallic container cylinder (4) inside which there is axially positioned a shaft (5) bearing the static work preload by means of a spacer spring (7) interposed between the plate (3) and a plate (6) held at one extremity of the same shaft (5), rigid revolving elements (9) being disposed between a viscoelastic material rolling race (10), preferably sheathing the shaft (5), and a metallic sliding race (8) consisting of a groove made in the inner wall of the container cylinder (4) in which the said rigid revolving elements are housed.

8 Claims, 8 Drawing Figures

ANTIVIBRATION DEVICE PARTICULARLY ADAPTED FOR AN AUTOMOTIVE ENGINE SUPPORT

DESCRIPTION

The present invention has for an object an antivibration device, particularly adapted for mounting motorcar engines, that is capable of providing a different braking action as a function of the amplitude of the vibrations.

One aim of the invention is to provide an antivibration device capable of furnishing a diverse damping action as a function of the amplitude for the vibrations, around the preloaded static state.

Another aim of the invention is to provide an antivibration device that does not require the use of cooling oils, and in such a way as to simplify the construction of the device.

For achieving these aims, the antivibration device, particularly adapted for supporting motorcar engines, that forms the object of the present invention is characterized in providing a plurality of rigid revolving elements interposed between a viscoelastic material rolling race and a metallic material sliding race, constituted by a circular groove made, preferably, in the internal part of a metallic container cylinder and in which said revolving elements are confined, maintaining their own centers of symmetry always on the same circumference in any preloaded state whatsoever.

The viscoelastic rolling race is disposed around a bearing shaft entering axially into said metallic container cylinder and resting upon a spring, calibrated in such a way as to maintain said shaft balanced under the preloaded static state.

In one particular form of the device according to the present invention, the said viscoelastic race has a right-angled cylindrical profile and presents a circular peripheral groove that is disposed adjacent the rigid revolving elements, under a preloaded static state, in such a way that for small vibrations around such a condition, the revolving elements remain in said groove, exercising a null (or almost null) braking action while, for vibrations of a greater amplitude, said groove shifts from its balanced position, allowing the revolving elements to exercise a constant braking action, rolling in the viscoelastic material.

According to variations in embodiments of the antivibration device forming the object of the present invention, the viscoelastic material rolling race is devoid of said peripheral groove, and instead presents, in section, parabolic profiles or conical profiles such as to give however, for small vibrations around the preloaded static state, a null (or almost null) braking action and to provide instead, for greater vibrations, a variable braking action as a function of the amplitude and in the sense of the vibration itself.

These and other characteristics of the antivibration device of the present invention will become even clearer from the detailed description that follows, referred to some exemplified and hence non-limiting forms of the device itself and illustrated in the attached drawings, wherein.

Figure 1:
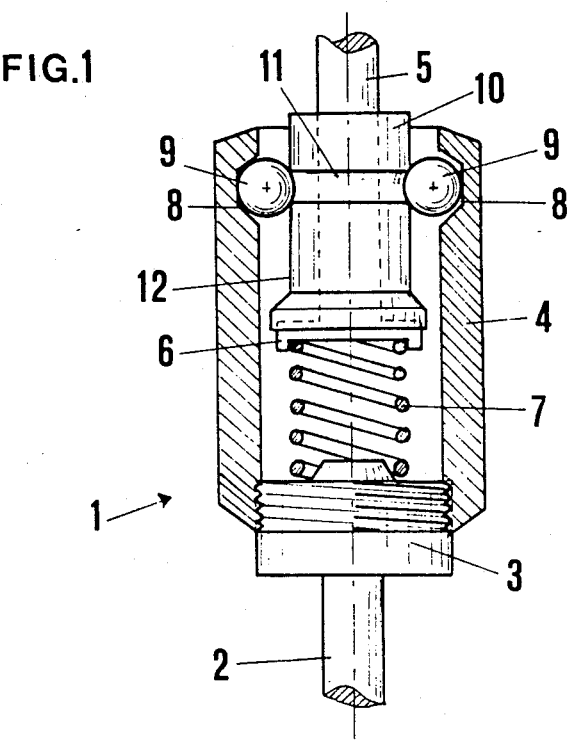
FIG. 1 is a partial axial sectional view of the antivibration device according to the present invention.

With reference to these figures, and for the moment particularly with reference to FIG. 1, with the numeral 1 indicating the antivibration device of the present invention, as stated previously said device finds convenient application in motorcar engine supports, but it can also be applied in any field whatsoever that requires the typical effect it produces, as will be illustrated further on.

Keeping to the field of engine supports, in FIG. 1 the numeral 2 indicates an element, in this instance a cylindrical shaft fixed below to a base (not shown in the figure), and bearing above, a circular plate 3 that is screwed or otherwise fastened to the lower extremity of a metallic container cylinder 4.

Inside the cylinder 4 there is positioned the shaft 5, adapted for supporting at least a part of the engine weight and terminating in its lower part with a plate 6, preferably circular, of a larger diameter. Between the plates 3 and 6 there is interposed a tared pressure spring 7, or the like means, arranged in such a way as to maintain the shaft 5 in the position indicated in FIG. 1 under a preloaded static state, i.e., in the absence of vibrations.

Inside the cylinder 4 there is a continuous circular groove 8 in which the rigid revolving elements 9 are lodged, which in the example shown in FIG. 1 and other figures, are spheres, the profile of the groove 8 being such that the spheres 9 can freely rotate in it without undergoing any appreciable shiftings in the vertical sense.

The shaft 5 is provided over a part of its length with a cladding 10 of viscoelastic material, having a groove 11 disposed in front of or adjacent the spheres 9 when the device is in a preloaded static state.

In this way the rigid revolving elements 9 are interposed between a viscoelastic rolling race 10 and a metallic sliding race, constituted by the groove 8 in which said elements are lodged.

For small vibrations of the shaft 5 or of the metallic container cylinder 4 around the preloaded static state, illustrated in FIG. 1, the device exercises an almost null braking action since the spheres 9 remain in or bear on the groove 11 made in the viscoelastic material race 10. When the amplitude of the vibrations in one or the other direction exceeds a certain value, the device 1 exercises a constant braking action due to the sinking and rolling of the spheres 9 in the cylindrical part 12 of the viscoelastic material race 10.

Figure 2:
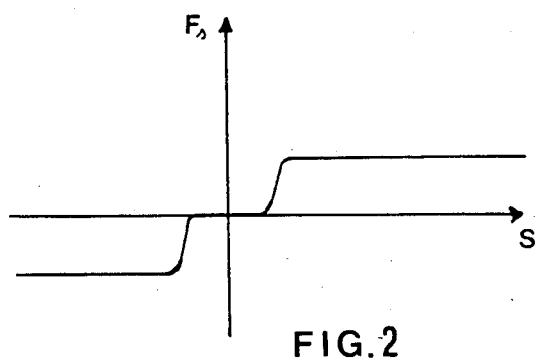
FIG. 2 shows the diagram of a typical curve of the damping force as a function of the shiftings or displacements, in accordance with the embodiment illustrated in FIG. 1.

The diagram of FIG. 2 gives a typical curve of the damping force as a function of the shiftings from the preloaded static state that are obtainable with the device illustrated in FIG. 1.

Figure 3:
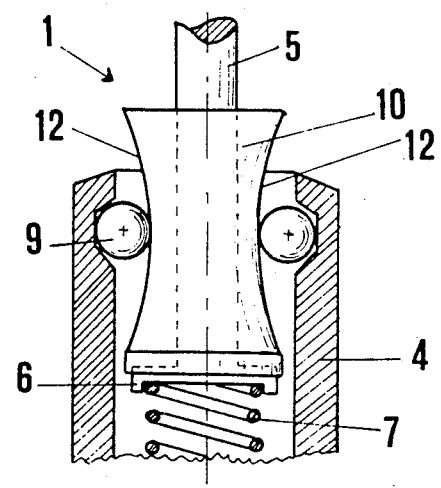
FIG. 3 illustrates an alternative embodiment of the antivibration device according to the invention.
Figure 5:
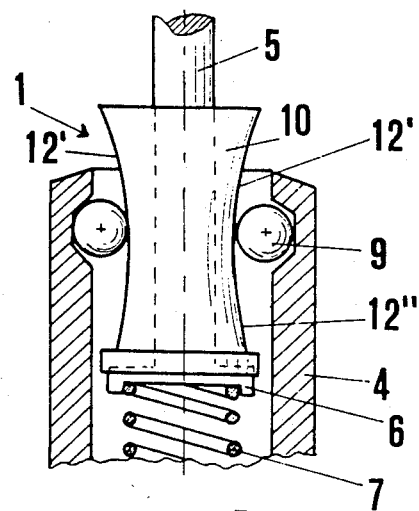
FIG. 5 is a further alternative embodiment of the antivibration device according to the present invention.

FIGS. 3 and 5 show two other embodiments of the antivibration device according to the invention, utilizing the same numerical references adopted for FIG. 1 for distinguishing parts that are substantially similar.

In the embodiment of FIG. 3, there is eliminated the peripheral groove 11 of FIG. 1, and instead the profile 12 of the viscoelastic material 10 is modified by causing it to assume a symmetrically curved development, as shown in the figure. Under preloaded static conditions the spherical revolving elements 9 are disposed in the narrowest or most hollowed-out part of the symmetrical profile 12 and, for small vibrations around about this condition, the braking force exerted by them is null or almost so. When the amplitude of the vibrations increases, the braking force also increases progressively, since the spheres 9 become even further embedded in the viscoelastic material race 10.

Figure 4:
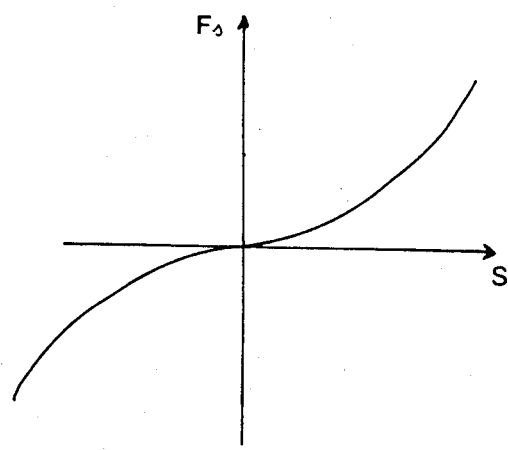
FIG. 4 is a diagram of a typical curve of the damping force as a function of the shiftings, in accordance with the embodiment of the device according to the invention shown in FIG. 3.

FIG. 4 is a diagram showing the development of the damping forces, as a function of the shiftings from the preloaded static condition, that are obtainable with the device that is shown in FIG. 3. The symmetry of the curve there shown demonstrates how the damping effect is the same, at a parity of the amplitude of the vibrations, in both the sliding senses.

In the embodiment of FIG. 5, the profile of the viscoelastic race 10 is made non-symmetrical so as to present a race 12' having a greater slope with respect to the contiguous race 12". In this instance, the braking action is maintained very low for small vibrations of the shaft 5 around this preloaded static condition. Instead, the braking action for greater amplitudes of the vibrations is differentiated in the two senses of the sliding of the shaft 5 with respect to the container cylinder 4.

Figure 7:
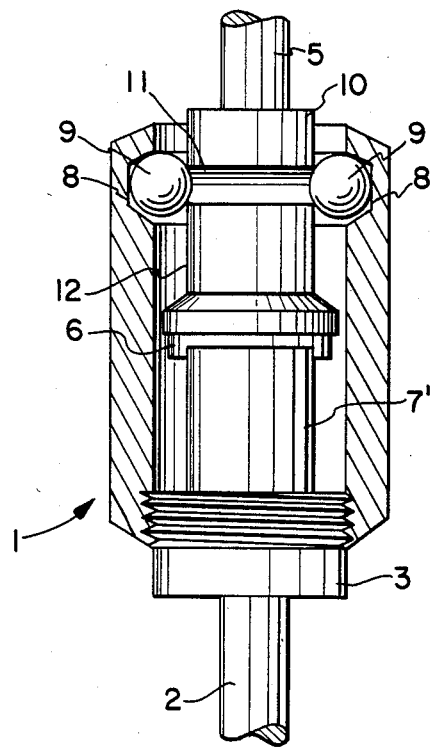
FIG. 7 illustrates a further alternative embodiment of the antivibration device according to the present invention.
Figure 8:
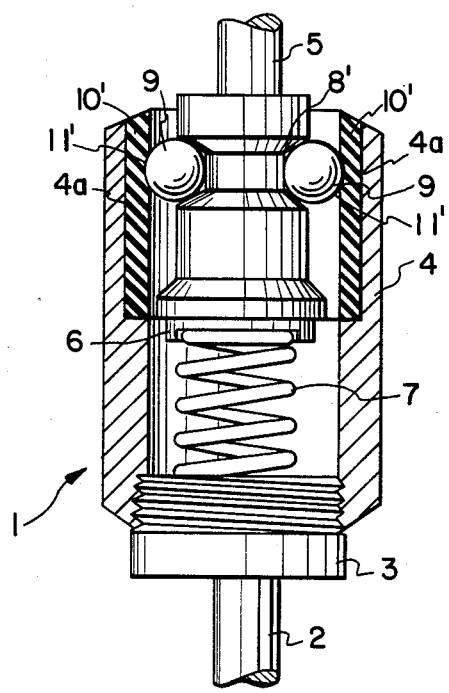
FIG. 8 illustrates yet another alternative embodiment of the antivibration device according to the present invention.

FIG. 7 illustrates an embodiment similar to that of FIG. 1, except that a rubber element 7' having a non-linear elastic response to deformation is substituted for spring 7. FIG. 8 also illustrates an embodiment which is similar to FIG. 1, except that viscoelastic material rolling race 10' having a groove 11' covers at least part of the inner wall 4a of metallic container cylinder 4 and a metallic material sliding race 8' is formed on shaft 5.

Figure 6:
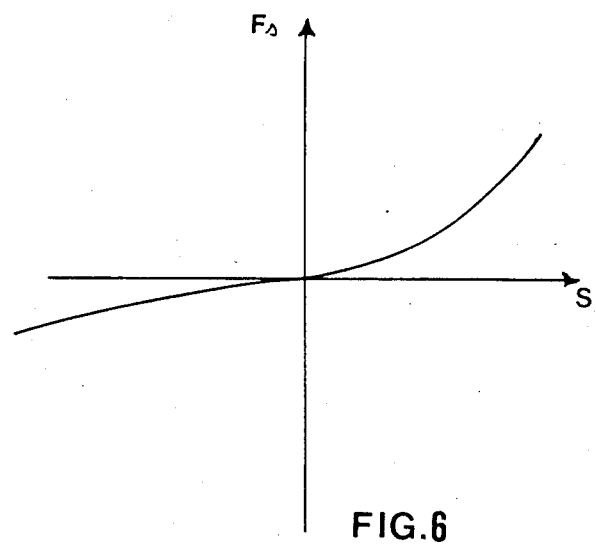
FIG. 6 shows a diagram of a typical curve of the damping force as a function of the shiftings, obtainable with the device of the invention according to the embodiment of FIG. 5.

One possible development of the damping force as a function of the shiftings from the preloaded static condition, in the embodiment of FIG. 5, is given in the graph of FIG. 6.

In all the embodiments of the antivibration device according to the present invention, cooling oil is unnecessary. As a matter of fact, the power lost due to the effect of hysteresis in the viscoelastic material of the rolling race 10 or 10', as proportional to the sum total of the partial products of the braking torques of the rollers 9 multiplied by the number of their rotations per unit of time, transformed into heat, becomes dispersed into the surrounding ambient or environment through the metallic container cylinder 4. In order to ensure a good working of the antivibration device according to the invention, the only thing that is advisable is a greasing of the groove 8 in which the spheres 9 are lodged.

Although the revolving elements 9 in the attached figures are shown as spheres, with suitable adaptions these can be rollers, pins or the like, just as indeed the shafts and the metallic container cylinder 4 may have a cross-section different from the circular one shown. For example, the element 5 may have a very thin and flexible section and, with this solution, in place of the spheres rollers may be used.

In another alternative variation, in place of the steel spring there may be provided an elastomeric material body, in particular (according to some uses) with elastic non-linear characteristics.

In still another embodiment, the device may have a spring 7 that works by traction instead of compression, the concept of the damping action still being valid.

According to a preferred embodiment, the device may comprise several rows of spheres or rollers arranged in such a way as to perform useful guide functions.

Also included in this invention is an arrangement wherein the viscoelastic material rolling race covers, at least partially, the inner wall of the metallic container cylinder, with the metallic sliding race being provided in the shaft.

What is claimed is:

1. An antivibration device, particularly adapted for mounting a motorcar engine, comprising a first shaft, a first plate having one face fixed to an end of said first shaft, a metallic container cylinder having (i) a lower extremity at which said first plate is fixed and (ii) an interior wall, a second shaft having a portion axially positioned within said cylinder, said second shaft for supporting the engine weight, a second plate carried at one end of said portion of said second shaft which is axially positioned within said cylinder, a tared spring interposed in a compressed state between said first plate and said second plate, a viscoelastic material rolling race disposed on a portion of said second shaft and comprising a narrowest surface portion, a metallic material sliding race comprising a circular groove in said interior wall in said metallic container cylinder, a plurality of rigid revolving elements interposed between said narrowest surface portion of said viscoelastic material rolling race and said metallic material sliding race, said revolving elements being disposed within said metallic material sliding race and said narrowest surface portion of said viscoelastic material rolling race, whereby when said second shaft is subjected to relatively small vibrations caused by said engine weight, said revolving elements remain within said narrowest surface portion of the viscoelastic material rolling race and when said second shaft is subjected to relatively great vibrations caused by said engine weight, having a magnitude which exceeds a predetermined high value, said revolving elements move out of said narrowest surface portion to a wider portion of said viscoelastic material rolling race to exert a braking force against said relatively great vibrations.

2. An antivibration device as in claim 1, wherein said narrowest surface portion comprises a groove in a surface of said viscoelastic material rolling race.

3. An antivibration device as in claim 1, wherein said viscoelastic material rolling race has a symmetrically curved surface profile comprising said narrowest surface portion.

4. An antivibration device as in claim 1, wherein said viscoelastic material rolling race further comprises portions with gradually increasing thickness with different slopes in directions away from said narrowest surface portion and toward opposite ends of said viscoelastic material rolling race.

5. An antivibration device as in claim 1, wherein said revolving elements are spheres.

6. An antivibration device, particularly adapted for mounting a motorcar engine, comprising a first shaft, a first plate having one face fixed to an end of said shaft, a metallic container cylinder having (i) a lower extremity at which said first plate is fixed and (ii) an interior wall, a second shaft having a portion axially positioned within said cylinder, said second shaft for supporting the engine weight, a second plate carried at one end of said portion of said second shaft which is axially positioned within said cylinder, a rubber element having a non-linear elastic response interposed between said first plate and said second plate, a viscoelastic material rolling race disposed on a portion of said second shaft and comprising a narrowest surface portion, a metallic material sliding race comprising a circular groove in said interior wall in said metallic container cylinder, a plurality of rigid revolving elements interposed between said narrowest surface portion of said viscoelastic material rolling race and said metallic material sliding race, said revolving elements being disposed within said metallic material sliding race and said narrowest surface portion of said viscoelastic material rolling race, whereby when said second shaft is subjected to relatively small vibrations caused by said engine weight, said revolving elements remain within said narrowest surface portion of the viscoelastic material rolling race and when said second shaft is subjected to relatively great vibrations caused by said engine weight, having a magnitude which exceeds a predetermined high value, said revolving elements move out of said narrowest surface portion to a wider portion of said viscoelastic material rolling race to exert a braking force against said relatively great vibrations.

7. An antivibration device, particularly adapted for mounting a motorcar engine, comprising a first shaft, a first plate having one face fixed to an end of said shaft, a metallic container cylinder having (i) a lower extremity at which said first plate is fixed and (ii) an interior wall, a second shaft having a portion axially positioned within said cylinder, said second shaft for supporting the engine weight, a second plate carried at one end of said portion of said second shaft which is axially positioned within said cylinder, a tared spring interposed between said first plate and said second plate for maintaining said second shaft in a preloaded static state, a viscoelastic material rolling race disposed on a portion of said second shaft and comprising a narrowest surface portion in a middle region thereof, a metallic material sliding race comprising a circular groove in said interior wall in said metallic container cylinder, a plurality of rigid revolving elements interposed between said narrowest surface portion of said viscoelastic material rolling race and said metallic material sliding race, said revolving elements being disposed within said metallic material sliding race and said narrowest surface portion of said viscoelastic material rolling race, whereby when said second shaft is subjected to relatively small vibrations caused by said engine weight, said revolving elements remain within said narrowest surface portion of the viscoelastic material rolling race and when said second shaft is subjected to relatively great vibrations caused by said engine weight, having a magnitude which exceeds a predetermined high value, said revolving elements move out of said narrowest surface portion to a wider portion of said viscoelastic material rolling race to exert a braking force against said relatively great vibrations.

8. An antivibration device, particularly adapted for mounting a motorcar engine, comprising a first shaft, a first plate having one face fixed to an end of said first shaft, a metallic container cylinder having (i) a lower extremity at which said first plate is fixed and (ii) an interior wall, a second shaft having a portion axially positioned within said cylinder, said second shaft for supporting the engine weight, a second plate carried at one end of said portion of said second shaft which is axially positioned within said cylinder, a tared spring interposed in a compressed state between said first plate and said second plate, a viscoelastic material rolling race disposed on at least part of said interior wall in said metallic container cylinder and comprising a groove in a surface of said viscoelastic material rolling race, a metallic material sliding race comprising a circular groove formed on said second shaft, a plurality of rigid revolving elements interposed between said groove formed in said surface of said viscoelastic material rolling race and said groove formed on said second shaft, said revolving elements being disposed within said metallic material sliding race and said groove in said surface portion of said viscoelastic material rolling race, whereby when said second shaft is subjected to relatively small vibrations caused by said engine weight, said revolving elements remain within said groove in said surface portion of the viscoelastic material rolling race and when said second shaft is subjected to relatively great vibrations caused by said engine weight, having a magnitude which exceeds a predetermined high value, said revolving elements move out of said groove in said surface portion of said viscoelastic material rolling race to a wider surface portion of said viscoelastic material rolling race to exert a braking force against said relatively great vibrations.

* * * * *